US010291524B2

(12) United States Patent
Tjahjono et al.

(10) Patent No.: US 10,291,524 B2
(45) Date of Patent: May 14, 2019

(54) DYNAMIC TUNNEL ESTABLISHMENT IN A MESH NETWORK

(71) Applicant: ABB Schweiz AG, Baden (CH)

(72) Inventors: Danu Tjahjono, Dublin, CA (US); Nan Li, Santa Clara, CA (US); Mosleh Uddin, Fremont, CA (US)

(73) Assignee: ABB Schweiz AG, Baden (CH)

( * ) Notice: Subject to any disclaimer, the term of this patent is extended or adjusted under 35 U.S.C. 154(b) by 78 days.

(21) Appl. No.: 15/679,429

(22) Filed: Aug. 17, 2017

(65) Prior Publication Data

US 2019/0058659 A1 Feb. 21, 2019

(51) Int. Cl.
| H04W 8/18 | (2009.01) |
| H04L 12/749 | (2013.01) |
| H04L 12/46 | (2006.01) |
| H04L 12/911 | (2013.01) |
| H04L 12/761 | (2013.01) |
| H04L 12/721 | (2013.01) |

(52) U.S. Cl.
CPC ........ H04L 45/741 (2013.01); H04L 12/4633 (2013.01); H04L 47/825 (2013.01); H04L 45/16 (2013.01); H04L 45/38 (2013.01)

(58) Field of Classification Search
None
See application file for complete search history.

(56) References Cited

U.S. PATENT DOCUMENTS

| 6,704,301 B2 | 3/2004 | Chari et al. |
| 6,965,575 B2 | 11/2005 | Srikrishna et al. |
| 7,058,021 B2 | 6/2006 | Srikrishna et al. |
| 7,551,562 B2 | 6/2009 | Srikrishna et al. |
| 7,688,808 B2 | 3/2010 | Ren et al. |
| 8,306,041 B2 | 11/2012 | Srikrishna et al. |
| 8,700,800 B2 | 4/2014 | Gupta et al. |
| 8,893,262 B2 | 11/2014 | Tjahjono et al. |
| 9,088,546 B2 | 7/2015 | Tjahjono et al. |
| 9,247,397 B2 | 1/2016 | Tjahjono et al. |
| 9,247,417 B2 | 1/2016 | Tjahjono et al. |
| 9,602,227 B2 | 3/2017 | Tjahjono et al. |
| 2003/0095504 A1* | 5/2003 | Ogier .................... H04L 1/1614 370/235 |
| 2004/0100953 A1* | 5/2004 | Chen ................... H04L 12/4633 370/389 |

(Continued)

Primary Examiner — Sithu Ko
(74) Attorney, Agent, or Firm — Brian R. Short

(57) ABSTRACT

Systems, methods, and apparatuses for supporting traffic of a wireless mesh network are disclosed. One apparatus includes a node that includes one or more transceivers for communicating with other devices of the wireless mesh network, and a processor. The processor is operative to perform operations including receiving routing packets from at least one upstream node of the wireless mesh network, where reception of the routing packets is facilitated by a first IP version; selecting an upstream routing path to an upstream gateway based on a routing path quality; determining from the routing packets whether a first upstream node directly upstream from the node supports a second IP version; and establishing an IP tunnel with the upstream gateway or a second upstream node of the upstream routing path that supports the second IP version if the first upstream node does not support the second IP version.

19 Claims, 6 Drawing Sheets

(56) References Cited

U.S. PATENT DOCUMENTS

2007/0223451 A1* 9/2007 Ren .................. H04W 40/14
                                                     370/352
2008/0310311 A1* 12/2008 Flammer ............ H04L 45/00
                                                     370/238
2015/0201323 A1* 7/2015 Tjahjono ............ H04W 8/186
                                                     370/312
2016/0014572 A1* 1/2016 Vetter ................ H04L 69/167
                                                     370/312

* cited by examiner

| Device | IP Versions Supported |
|---|---|
| Gateway 102 | IPvA, IPvB |
| Node 104 | IPvA, IPvB |

Example Beacon at
Node 104

304

| Device | IP Versions Supported |
|---|---|
| Gateway 102 | IPvA, IPvB |
| Node 104 | IPvA, IPvB |
| Node 106 | IPvA |

Example Beacon at
Node 106

306

| Device | IP Versions Supported |
|---|---|
| Gateway 102 | IPvA, IPvB |
| Node 104 | IPvA, IPvB |
| Node 106 | IPvA |
| Node 108 | IPvA, IPvB |

Example Beacon at
Node 108

DYNAMIC TUNNEL ESTABLISHMENT IN A MESH NETWORK

FIELD OF THE DESCRIBED EMBODIMENTS

The described embodiments relate generally to wireless communications. More particularly, the described embodiments relate to systems, methods, and apparatuses for distributing traffic through a wireless mesh network.

BACKGROUND

In computer networking, traffic in a wireless mesh network involves the transmission of information between client devices and a gateway via access nodes. Transmission among access nodes may occur based on Internet protocol (IP), which is a communications protocol for relaying datagrams across network boundaries. There are different IP versions for delivering packets between a network node and the gateway based in part on addressing methods. Different IP versions are not designed to be interoperable. As such, a given network node that supports packets with IP addresses compliant with one IP version might not support packets with IP addresses compliant with a different IP version.

It is desirable to have methods, systems, and apparatuses for implementing a wireless mesh network that provides transmission of information between a client device and other devices in a wireless mesh network.

SUMMARY

An embodiment includes a node of a wireless mesh network. The node includes one or more transceivers for communicating with other devices of the wireless mesh network, and a processor. The processor is operative to perform operations including receiving, through the one or more transceivers, a plurality of routing packets from at least one upstream node of the wireless mesh network, where reception of the plurality of routing packets is facilitated/controlled by a first Internet protocol (IP) version. The processor is further operative to perform operations including selecting an upstream routing path to an upstream gateway based on a routing path quality as determined based at least in part on the received plurality of routing packets. The processor is further operative to perform operations including determining from the plurality routing packets whether a first upstream node directly upstream from the node of the upstream routing path supports a second IP version. The processor is further operative to perform operations including establishing an IP tunnel with the upstream gateway or a second upstream node of the upstream routing path that supports the second IP version if the first upstream node does not support the second IP version.

An embodiment includes a method of establishing a wireless mesh network. The method includes receiving, through the one or more transceivers, a plurality of routing packets from at least one upstream node of the wireless mesh network, where reception of the plurality of routing packets is facilitated/controlled by a first IP version. The method further includes selecting an upstream routing path to an upstream gateway based on a routing path quality as determined based at least in part on the received plurality of routing packets. The method further includes determining from the plurality routing packets whether a first upstream node directly upstream from the node of the upstream routing path supports a second IP version. The method further includes establishing an IP tunnel with the upstream gateway or a second upstream node of the upstream routing path that supports the second IP version if the first upstream node does not support the second IP version.

Another embodiment includes a node of a wireless mesh network. The node includes one or more transceivers for communicating with other devices of the wireless mesh network, and a processor. The processor is operative to perform operations including receiving, through the one or more transceivers, a plurality of routing packets from at least one upstream node of the wireless mesh network, where reception of the plurality of routing packets is facilitated/controlled by a first IP version. The processor is further operative to perform operations including selecting an upstream routing path to an upstream gateway based on a routing path quality as determined based at least in part on the received plurality of routing packets. The processor is further operative to perform operations including receiving, through the one or more transceivers, a plurality of data packets from at least one downstream node, where each data packet of the plurality of data packets is compliant with a second IP version. The processor is further operative to perform operations including encapsulating each data packet of the plurality of data packets that are compliant with the second IP version with a header that is compliant with the first IP version. The processor is further operative to perform operations including transmitting the encapsulated data packets upstream to the upstream gateway or an upstream node that supports the second IP version.

Other aspects and advantages of the described implementations will become apparent from the following detailed description, taken in conjunction with the accompanying drawings, illustrating by way of example the principles of the described implementations.

BRIEF DESCRIPTION OF THE DRAWINGS

FIG. 3 shows example routing beacons at different access nodes in the wireless mesh network, according to an embodiment.

DETAILED DESCRIPTION

Figure 1:
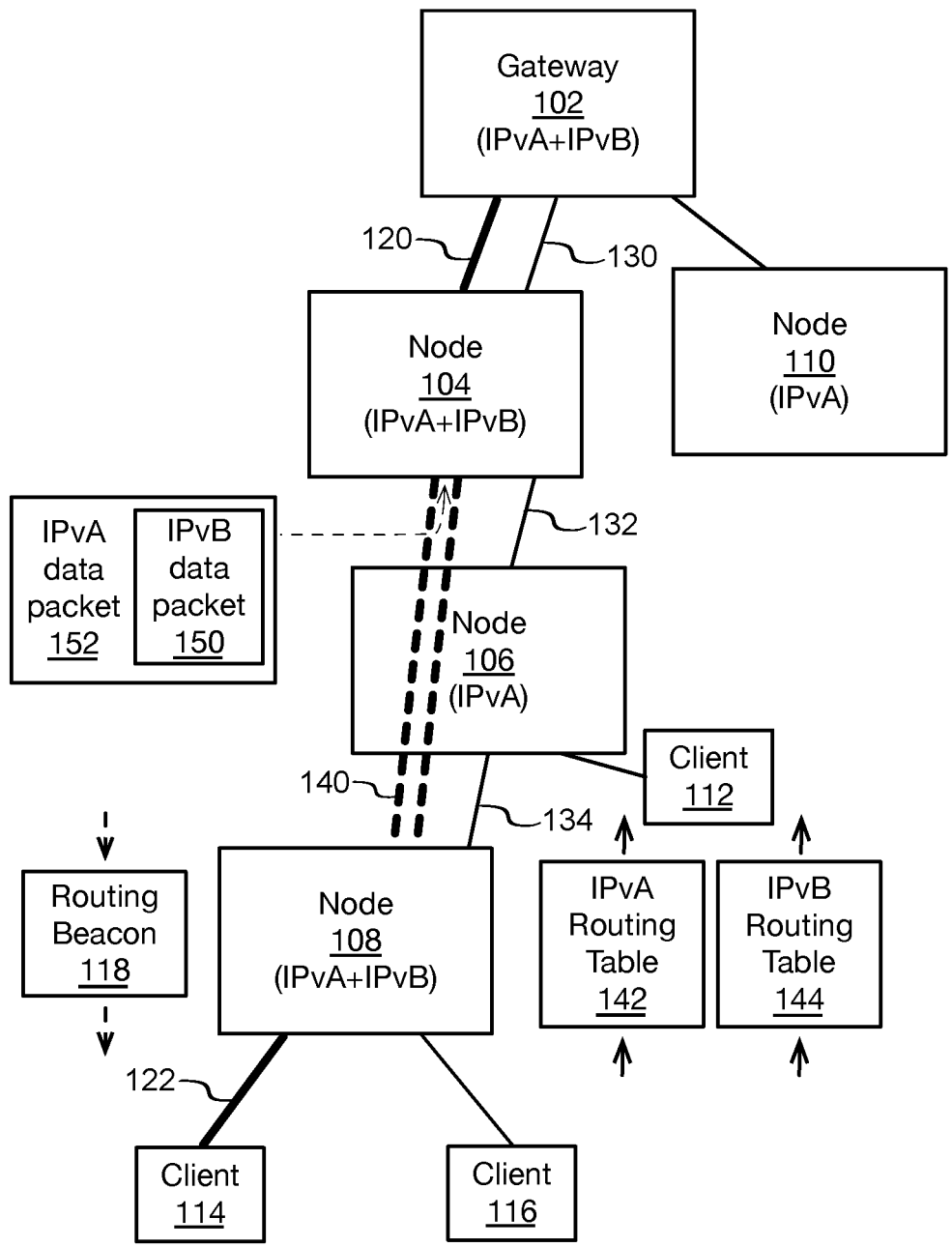
FIG. 1 shows an example wireless mesh network that includes a gateway, multiple access nodes, and multiple client devices, where the access nodes transmit traffic in the wireless mesh network between the client devices and the gateway, according to an embodiment.

At least some embodiments efficiently support clients that handle traffic associated with one IP version on the layer 3 IP stack of a wireless mesh network that is based on a different IP version. As described in more detail herein, embodiments support such traffic by establishing dynamic tunnels and transmitting some traffic through such dynamic tunnels.

As described in more detail herein, at least some embodiments establish tunnels to build routes of one IP version on top of existing routes of another IP version, where the latter IP version is used for selecting and building wireless routes between a gateway and access nodes of a wireless mesh network. For ease of illustration, the existing IP version may be referred to as IPvA, and the other IP version may be referred to as IPvB. In an embodiment, IPvB may be a subsequent version to IPvA, for example. In at least some embodiments, routing paths are established, and data propagates through the routing paths. In some embodiments, the routing paths are initially selected and established via IPvA and additional routing paths are subsequently established via IPvB, and data can propagate through the routing paths via IPvA or IPvB. As described in more detail herein, embodiments employ various techniques of supporting a mix of IPvA and IPvB client traffic over an IPvA-based wireless mesh network. This reduces and potentially eliminates tunnels directly connected to the gateway by selectively establishing tunnels where needed in the wireless mesh network.

In some embodiments, one or two separate routes between two access notes may be defined by IP routing tables. In some embodiments, each node that supports both IP versions has both an IPvA routing table and an IPvB routing table, where each routing table defines separate routes. The terms "routes" and "routing paths" may be used interchangeably.

As indicated herein, routing paths are initially selected and established via IPvA through the nodes. These selected routing paths are used to form the IPvA routing tables of each node, which is used to generate and an initial mesh network. Once these routes have been selected, the nodes that also support IPvB then generate additional routing paths to support IPvB traffic, where the additional routing paths include tunnels. These additional routing paths are used to form the IPvB routing tables, which may be based on the IPvA tables and the determined tunnels.

In various embodiments, both IPvA and IPvB data propagate through the same physical routes (e.g., physical layer 1), yet are sent through different routes at the IP level (e.g., network layer 3) either through the originally selected IPvA routes or the subsequently determined IPvB routes based on the different IPvA and IPvB routing tables that exist for each node.

As described in more detail herein, in an embodiment, a node receives, through the one or more transceivers, multiple routing packets from at least one upstream node of a wireless mesh network, where reception of the plurality of routing packets is facilitated/controlled by a first IP version (e.g., IPvA). The node selects an upstream routing path to an upstream gateway based on a routing path quality as determined based at least in part on the received plurality of routing packets. The node determines from the routing packets whether a first upstream node directly upstream from the node of the upstream routing path supports a second IP version (e.g., IPvB). The node then establishes an IP tunnel with the upstream gateway or a second upstream node of the upstream routing path that supports the second IP version if the first upstream node does not support the second IP version. Thereafter, the node sends traffic of the second IP version to the upstream node that supports the second IP version via the tunnel.

FIG. 1 shows an example wireless mesh network 100 that includes a gateway 102, multiple access nodes or nodes 104, 106, 108, and 110, and multiple client devices 112, 114, and 116, where the access nodes transmit traffic in the wireless mesh network between the client devices 112, 114, and 116 and the gateway 102, according to an embodiment.

As described in more detail herein, in an embodiment, each of the access nodes 104, 106, 108, and 110 selects a routing path to the gateway 102. Example implementations directed to selecting routing paths are described in more detail herein. Through the routing path(s), the access nodes 104, 106, 108, and 110 are coupled either directly or indirectly to the gateway 102. That is, each access node is either directly connected to the upstream gateway 102, or indirectly connected through another access node to the upstream gateway 102. Many factors may be included in the decision of which access nodes or gateways each access node is connected.

For ease of illustration, one gateway 102, four access nodes 104, 106, 108, and 110, and three client devices 112, 114, and 116 are shown in FIG. 1. The wireless mesh network 100 may have any number of gateways, access nodes, and client devices, depending on the particular implementation. Further, two primary routing paths are shown in FIG. 1. For example, one primary routing path shown includes the nodes 108, 106, and 104 to the gateway 102, and another primary routing path shown includes the node 110 to the gateway 102. The wireless mesh network 100 may have any number routing paths that constitute a primary routing path, depending on the particular implementation. For example, routing paths or links between each of the nodes 108, 106, and 104 constitute a primary routing path to the gateway 102. The terms "access nodes" and "nodes" may be used interchangeably.

In an embodiment, the gateway 102 is interfaced with an upstream network (not shown). The gateway 102 may include a high-bandwidth connection to the upstream network, which can be wired or wireless. Further, the upstream network can include wired and wireless links.

For an embodiment, the gateway 102 is an access node that originates routing beacons. As described in more detail herein, for an embodiment, the gateway 102 broadcasts beacon routing packets, or routing beacons, which can be used by each node to determine routing between the access nodes 104, 106, 108, 110, etc., and the gateway 102, as well as with other gateways of the network. As described in more detail herein, these routing beacons also indicated what IP versions are supported by each node upstream.

In an embodiment, each of the access nodes 104, 106, 108, and 110 includes one or more transceivers for communicating with other devices of the wireless mesh network, and includes a processor that is operative to perform various operations described herein. While example embodiments are described in the context of wireless nodes in a wireless mesh network, these embodiments and others also apply to wired nodes in a mesh network.

In an embodiment, the wireless mesh network 100 may be formed using IPvA mesh routing techniques at the layer 3 IP stack. The wireless mesh network 100 may include access nodes (e.g., routers, etc.) meshing with each other in a tree topology, and the gateway 102 router may be connected to a backhaul at the root of the tree topology. The other routers may be referred to as access nodes, or "nodes."

In some embodiments, when a given node selects its upstream route, the given node communicates this selection to the upstream node in a reverse routing beacon. In various implementations, reverse routing beacons may be used to communicate to upstream nodes that their downstream node has initially selected them in route selection (e.g., in an IPvA mesh building process). For example, if the node 106 selects the upstream node 104, the node 106 sends a reverse routing beacon upstream to the node 104 indicating that the node 104 is within upstream path between the node 106 and an upstream gateway, such as, gateway 102.

In some embodiments, reverse routing beacons may be used to communicate to upstream nodes that their downstream node has selected them in establishing tunnels (e.g., in an IPvB mesh building process). For example, if the node 108 selects the upstream node 104 when establishing an IPvB tunnel, the node 108 sends a reverse routing beacon upstream to the node 104 indicating that the node 104 is the target or destination node of the new tunnel. Similarly, the node 104 sends a routing beacon downstream to the node 108 indicating that the node 108 is the target or destination node at the other end of the new tunnel. While the tunnel formation of FIG. 1 is shown as being between the node 104 and the first upstream node that supports both IPvA and IPvB, it is to be understood that the tunnel can be formed between node 104 and any upstream node that supports both IPvA and IPvB.

As shown, the nodes 104 and 108 support both IPvA and IPvB. The nodes that support IPvB traffic each have a dual stack that includes an IPvA stack and an IPvB stack. The nodes 106 and 110 support IPvA but do not support IPvB. The nodes 106 and 110 that do not support IPvB may have a single IPvA stack, or may have a dual stack with an IPvA stack and an IPvB stack disabled. Client 114 is a wired or wireless IPvB client that is connected to the node 108. A thick connector line (e.g., thick connector lines 120 and 122) indicates a route for IPvB traffic. The clients 112 and 116 are IPvA clients that are connected to the nodes 106 and 108, respectively. A thin connector line (e.g., thin connector lines 130, 132, and 134) indicates a route for IPvA traffic. Thick dotted connector lines indicate a tunnel 140 for IPvB traffic. Tunnels are described in more detail herein. For ease of illustration, two different lines 120 and 130 between the node 104 and the gateway 102 are shown in order to convey the concept of two different types of traffic (IPvA and IPvB), as well as two different routes based on two different routing tables (e.g., IPvA routing table for IPvA traffic, and IPvB routing table for IPvB traffic). At the physical layer 1, a single physical link or physical interface may be used to transmit both types of traffic, as each physical interface supports both IPvA and IPvB addresses.

Shown is an example IPvA routing table 142 and an IPvB routing table 144. In at least some embodiments, when a given routing table is updated at a given node, the node sends the updated routing table upstream in a reverse routing packet. Two routing tables (IPvA routing table 142 and an IPvB routing table 144) are shown to illustrate that the node 108, being a dual stack node, has two associated routing tables 142 and 144. In an embodiment, both routing tables 142 and 144 may potentially be updated and thereafter sent in one or more reverse routing packet upstream in order to update upstream nodes. In an embodiment, a single routing table (e.g., routing table 144) when updated may be sent upstream in a reverse routing packet, which the other routing table (e.g., routing table 142) is not sent upstream if not updated.

In an embodiment, the wireless mesh network 100 is first formed using IPvA techniques, after which an IPvB mesh is formed at nodes where IPvB is enabled. More specifically, once the wireless mesh network that operates on the IPvA stack has been formed (e.g., the route is selected per IPvA), IPvB tunnels are set up to establish a wireless mesh network that operates on the IPvB stack. As such, data traffic passes through the selected routes as IPvA or IPvB traffic.

Referring to the node 108, in a scenario where the next upstream hop node 106 does not support IPvB traffic, the node 108 may establish an IPvB-over-IPvA encapsulation tunnel 140 to an upstream node 104 that does support IPvB and that has the highest quality route. In this scenario, the node 106 and other nodes that do not support IPvB forward IPvB traffic through the IPvB-over-IPvA encapsulation tunnel (B-in-A tunnel).

In some embodiments, the IPvB data is encapsulated by inserting the IPvB data packets into IPvA data packets. For example, as shown, an IPvB data packet 150 is encapsulated into an IPvA data packet 152. As such, the IPvA data packet 152 encapsulating the IPvB data packet 150 passed through the tunnel 140 from the node 108 to the node 104.

As described in more detail herein, a beacon routing packet 118 or routing beacon 118 that is passed from the gateway 102 to each of the downstream nodes 104, 106, and 108 indicates which of the nodes supports IPvB traffic. The terms "beacon routing packet," "routing beacon," and "beacon" may be used interchangeably. Example operations of devices of the wireless mesh network 100 are described in more detail herein. In at least some embodiments, the beacon routing 118 includes routing information that indicates all of the nodes included within the selected routing path between each node and the gateway, and indicates which IP versions each node supports.

Figure 2:
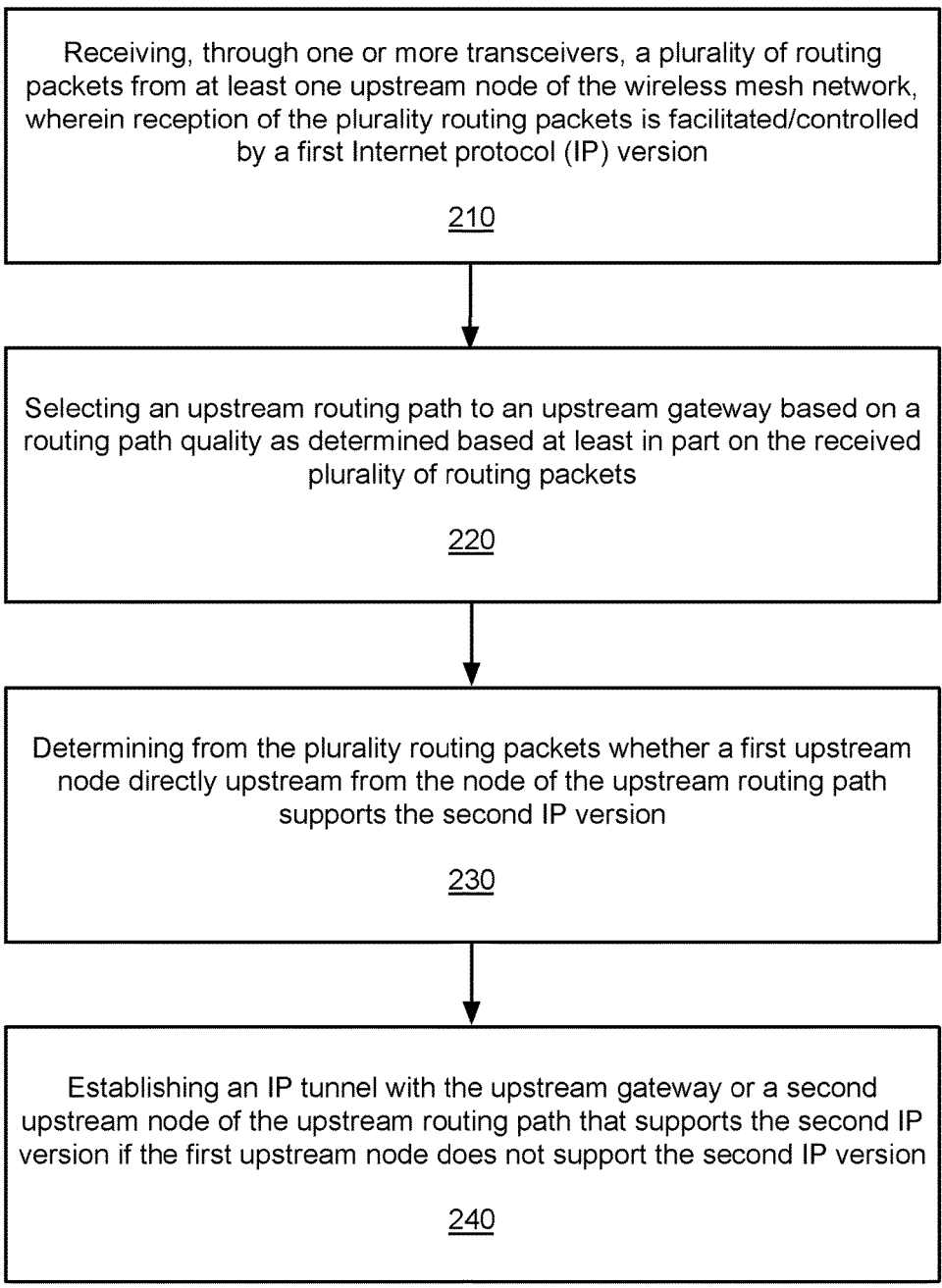
FIG. 2 shows an example flow chart that includes steps of a method of supporting traffic of a wireless mesh network, according to an embodiment.

FIG. 2 shows an example flow chart that includes steps of a method of supporting traffic of a wireless mesh network, according to an embodiment. A first step 210 includes receiving, through the one or more transceivers of a node (e.g., node 108 of FIG. 1), multiple routing packets from at least one upstream node of the wireless mesh network, where reception of the routing packets is facilitated/controlled by a first IP version (e.g., IPvA). For ease of illustration, some embodiments are described herein from the perspective of the node 108. It is to be understood that the described embodiments for supporting traffic of a wireless mesh network are applicable to any of the access nodes 104, 106, 108, and 110 of the wireless mesh network 100.

In an embodiment, the routing packets received from the one or more upstream nodes may be routing beacons that originate at the upstream gateway and continue downstream toward other nodes. In an embodiment, nodes that support IPvB inform their neighboring nodes whether they support IPvB-over-IPvA routing (B-in-A routing) via these routing beacons as part of the IPvA meshing techniques. Nodes that support IPvB and B-in-A routing may be referred to as dual stack routers.

Each node receives routing beacons from its upstream nodes along the route from the gateway. In an embodiment, each beacon may also carry a flag from its upstream nodes indicating whether they support and enable IPv6. An alternative approach is for the node to query the gateway 102 about this flag, assuming the gateway 102 is already receiving other flags from other nodes. This approach may be used, for example, for the old/existing routers that only support IPvA and cannot be upgraded to the new software.

In an embodiment, each of the routing packets received from the one or more upstream nodes may include routing table information and a list of upstream nodes that support the second IP version (e.g., IPvB). In an embodiment, each of the routing packets received from the one or more upstream nodes may also include a list of upstream nodes that do not support the second IP version. In an embodiment, each of the routing packets may include routing table information that includes all nodes in the routing path to the gateway.

A second step 220 includes selecting an upstream routing path to an upstream gateway based on a routing path quality as determined based at least in part on the received routing packets. In an embodiment, the method may further include selecting the first upstream node based at least in part on the first upstream node having a highest quality routing path. In an embodiment, the method may further include selecting the first upstream node based at least in part on whether the first upstream node supports IPvB.

For an embodiment, the upstream routing paths may be selected based on a persistence of received routing beacons. For an embodiment, reverse beacons are transmitted upstream that include information of the selected route, allowing upstream devices to update their routing tables to allow the upstream devices to properly route data packets to the access node through the selected route. Accordingly, each node maintains a routing table of downstream access nodes that have selected a routing path through the respective node based on reverse routing beacons received from the downstream nodes.

For an embodiment, the gateway 102 broadcasts routing packets (beacons), which can be used to determine routing between the nodes 104, 106, 108, 110, etc. and the gateway 102, as well as with other gateways of the network. For this embodiment, the routing beacons are received by all first-level access nodes (for example, access node 104), which are access nodes that are able to receive gateway transmitted beacons, and directly route data through to the gateway 102.

For an embodiment, the beacons are used to establish a route from each node 104, 106, 108, and 110 to the gateway 102. As described in more detail herein, for an embodiment, the first level access nodes re-broadcast the beacon data, attaching their own information to the routing beacon. The information indicates to the second level access nodes that the path to the gateway includes the first level access node. The wireless mesh network can include any number of levels of access nodes.

As indicated herein, in some embodiments, the routing packets are used for the routing selection. In at least some embodiments, the persistence or percentage of received packets can be used for selecting the route. Other embodiments can include signal-to-noise ratio (SNR) of the received routing packets or other quality indicator such as packet error rate (PER), bit error rate (BER), hop count (which is included within the beacons), interface types of the nodes. In some embodiments, the routing packets include the IP versions supported by the node originating the packet, and the packets include the IP versions of the upstream packets. For an embodiment, the routing selection is based at least in part on the IP versions supported by the upstream node. For example, for an embodiment, an upstream node that supports IPvA and IPvB is preferably selected as the upstream route over and upstream node that only supports IPvA.

A third step 230 includes determining from the routing packets whether a first upstream node directly upstream from the node of the upstream routing path supports the second IP version (e.g., IPvB). For ease of illustration, the term "first IP version," which refers to a particular IP version, is distinguished from the term "second IP version," which refers to a different IP version. The term "first IP version" does not necessarily refer to an IP version 1, and the term "second IP version" does not necessarily refer to an IP version 2. As such, the terms "first IP version" and "second IP version" may refer any two particular IP versions that are different. For example, in an embodiment, the first IP version may be IP Version 4 (IPv4). In an embodiment, the second IP version may be IP Version 6 (IPv6). As indicated herein, for further clarification, the term "first IP version" may be referred to herein as "IPvA," and the term "second IP version" may be referred to herein as "IPvB."

A fourth step 240 includes establishing an IP tunnel with the upstream gateway or a second upstream node of the upstream routing path that supports the second IP version if the first upstream node does not support the second IP version. In an embodiment, the node establishing the tunnel (e.g., the node 108) selects an upstream node that supports IPvB based on a route quality. In an embodiment, the route quality may be based on the quality link between the node establishing the tunnel and the selected upstream node. In an embodiment, the route quality may be based on the number hops. In some scenarios, an upstream node with the closest hop may have the highest quality link.

In an embodiment, the node 108 establishing the tunnel selects an upstream node that supports IPvB in order to reduce the number of tunnels for routing efficiency and performance. For example, this may avoid packets needlessly being routed through multiple tunnels when one tunnel will suffice.

In an embodiment, the node 108 may have multiple interfaces, including logical interfaces, and real or physical interfaces, where any number of logical interfaces and physical interfaces are possible. For an embodiment, the at least one logical interface is not tied to a physical port, and created to send and receive IP traffic. Physical interfaces may be referred to as native interfaces. When dealing with multicasting, the number of packets to be duplicated can be reduced by using native IPvB interfaces when possible instead of additional tunneling.

In an embodiment, once the node 108 has selected its default upstream node (e.g., node 104) with which to mesh (e.g., toward the gateway 102) as part of the IPvA meshing techniques, the node 108 checks whether the upstream node 104 has the IPvB flag enabled. If so, the node 108 then sets up the IPvB routes in order to use its native IPvB interface. In an embodiment, if the next hop upstream node has its IPvB flag enabled, no tunnel is created. Instead, the node will use its native IPvB interface to send IPvB traffic upstream.

If the upstream node 104 has its IPvB flag disabled (e.g., the node 104 cannot or does not plan to support IPvB), the node 108 then finds and selects the next next hop upstream node on the route toward the gateway 104 that supports IPvB and sets up the tunnel to that node accordingly. A given node that does support IPvB may have its IPvB flag disabled due to limited resources. In addition, in an embodiment, every node along the route to the gateway 102 will establish and send a reverse routing beacon to the corresponding upstream node such that all the IPvB routes are built upward so that each subsequent upstream node can further establish the IPvB route to the gateway 102 accordingly.

Once the target upstream node is found, the node 108 establishes the tunnel 140 to the target upstream node 104. Specifically, the node 108 creates one end of the tunnel 140 and sets up a control channel for IPvB information and commands to the target upstream node 104, which establishes the other end of the tunnel 140. In an embodiment, the control channel is the user datagram protocol (UDP) port where nodes supporting IPvB listen to a probe and any route update information from other nodes.

In an embodiment, the node 108 selects the upstream (e.g., the node 104) with which to establish a tunnel, and determines the local end point address of the tunnel corresponding to the physical interface of the upstream node 104.

After the tunnel is established, the node 108 and node 104 at each end of the tunnel may transmit IPvB traffic to each other using there physical or native interfaces.

The following describes example embodiments of establishing a tunnel and routing tables. In an embodiment, the node 108 selects the node 106 as a last hop based on downstream routing beacons via IPvA. The node 108 installs an IPvA routing table, where the default route is via 104 IPvA. The node 108 identifies that the node 106 does not have IPvB enabled based on the routing beacons via IPvA. The node 108 identifies that the node 104 (second last hop) has IPvB enabled. The node 108 initializes a tunnel with a unique name (e.g., tunnel_104IPvA) as one parameter in the tunnel setup, where the node 104 is the target or destination upstream node, and where IP address 104IPvA corresponds to the IPvA address of the node 104. The node 108 updates its IPvB routing table, where the route is via the node 104 IPvB address (e.g., tunnel_104IPvA). The node 108 notifies the upstream node 104 using reverse routing beacons that the node 108 created the tunnel. The node 104 initializes the tunnel with a unique name (e.g. tunnel_108IPvA) as one parameter in tunnel setup, where the node 108 is the target or destination downstream node, and where the IP address 108IPvA corresponds to the IPvA address of the node 108. The node 104 updates its IPvB routing table, where the route is upstream to 108 IPvB using the unique name (e.g., tunnel_108IPvA).

In an embodiment, when the client 114 is connected, the node 108 establishes a direct route to client 114 based on IPvB. The node 108 notifies the node 104 that the client 114 is connected based on IPvB connected and updates the IPvB routing table to show the route to client 114. The node 104 updates its IPvB routing table to include the IPvB route to the client 114 via the IPvB route to the node 108 (e.g., tunnel_108IPvA).

In an embodiment, for each node there is one tunnel to its upstream node that supports IPvB, and there may be multiple tunnels to its downstream nodes that support IPvB.

In an embodiment, the method may further include generating a tunnel identifier for the IP tunnel, where the tunnel identifier includes a node identifier associated with the node, and communicating a reverse beacon to the second upstream node, where the reverse beacon indicates the establishment of the IP tunnel. In response to the reverse beacon indicating the establishment of the IP tunnel, the second upstream node may in turn create a tunnel identifier based on the sender of the reverse beacon.

For example, in an embodiment, the generated tunnel identifier may be based on the unique identifier of the target upstream node 104 (e.g., tunnel_104IPvA), where the IP address 104IPvA corresponds to the IPvA address of node 104. This result is a unique tunnel name.

In an embodiment, the method may further include adding to each routing packet received from the at least one upstream node, information that indicates one or more IP versions that the node supports, and transmitting each routing packet with the added information downstream. Similarly, in an embodiment, the added information may be added to the IPvB routing table, and the method may further include sending updated IPvB routing table in reverse routing beacons upstream to upstream nodes.

As indicated herein, for at least some embodiments, the IPvB traffic may be encapsulated into an IPvA packet, which may be transmitted through the tunnel. Once the IPvB traffic has been received and encapsulated into an IPvA packet, the IPvA packet is forwarded to an upstream device (upstream access node or upstream gateway). That is, when an access node of the wireless mesh network has received the IPvB traffic, the wireless mesh network makes the IPvB traffic available to devices both inside and outside of the wireless mesh network. Accordingly, each access node forwards the IPvA-encapsulated IPvB packet upstream until the IPvB packet is eventually forwarded up to the gateway 102, and/or to one or more other gateways of the wireless mesh network.

Once the gateway 102 receives the forwarded IPvB packet from a downstream access node, the gateway then de-encapsulates the IPvB packet (if not already de-capsulated by an IPvB enabled node) and forwards the IPvB traffic up to the upstream network when there is a client device in the upstream network that is to receive the IPvB traffic. For an embodiment, when the gateway 102 receives IPvB packet from a downstream device, the gateway 102 may send the IPvB packet over a backhaul network to other gateways.

FIG. 3 shows example routing beacons 304, 306, and 308 at different access nodes in the wireless mesh network, according to an embodiment. In an embodiment, each access node establishes a routing table for the purposes of determining whether and where to route traffic received by the access node. Information from the routing table is included in routing beacons 304, 306, and 308 and transmitted downstream.

For an embodiment, the device identifier for an access node may be an IP address. For an embodiment, the device identifier for a client device may be an IP address or some other type of identifier.

The routing beacons 304, 306, and 308 allow upstream access nodes and the gateway 102 to properly route packets received to a particular access node, and also allow an access nodes to properly route received packets to other downstream devices if any. Further, the routing tables also allow access nodes to properly route upstream data packets to upstream nodes and the gateway. In an embodiment, each access node maintains one or more routing tables of their immediate upstream node established based on IPvA, also referred to as a "default route."

Referring to FIGS. 1 and 3, in this particular example, the node 104 receives a routing beacon from the gateway 102. In an embodiment, it is presumed that the gateway 102 already supports IPvB traffic. In an embodiment, there may be an IPvB flag enabled for the gateway 102, as shown in routing table 304.

After the node 104 selects the gateway 102 as its upstream node as part of the IPvA mesh building process using its native interface, the node 102 also selects the gateway 102 as its upstream IPvB route using the same native interface since the gateway 102 has the IPvB flag enabled.

The node 104 then starts sending its IPvB routes (e.g., for its downstream nodes and client devices) to the gateway. Note that the node 104 also sends its IPvA routes to the gateway through different control channels as part of the IPv4 mesh process.

When the node 104 sends routing beacons to the node 106, the node 104 appends the flag associated with the gateway (GW) 102 and the flag associated with the node 104 to the routing beacons, as shown in routing table 304. In an embodiment, the node 104 beacon may be (Node 104 IP, IPvBflag)+(GW IP, IPvBflag).

Next, the node 106, which does not support IPvB, meshes to the node 104 as its IPvA upstream route. The node 106 also appends the flags associated with the upstream devices (e.g., the gateway 102 and the node 104) and the flag associated with the node 106 to the routing beacons, as shown in routing table 306. In an embodiment, the node 104 beacon may be (Node 106 IP, no IPvB Flag)+(Node 104 IP, IPvB Flag)+(GW IP+IPvB flag) and broadcasts these to the node 108.

Next, the node 108 meshes to the node 106. Since the node 108 supports IPvB, the node 108 checks the routing beacons and determines that the node 106 does not support IPvB. The node 108 also appends the flags associated with the upstream devices (e.g., the gateway 102, the node 104, and the node 106) and the flag associated with the node 108 to the routing beacons, as shown in routing table 308. The node 108 then checks the next next hop, which is the node 104, which supports IPvB. As indicated herein, the node 108 creates or establishes the tunnel 140 to the node 104. The node 108 does not establish a tunnel to the gateway 102, because the node 104 is closer than the gateway 102.

Figure 4:
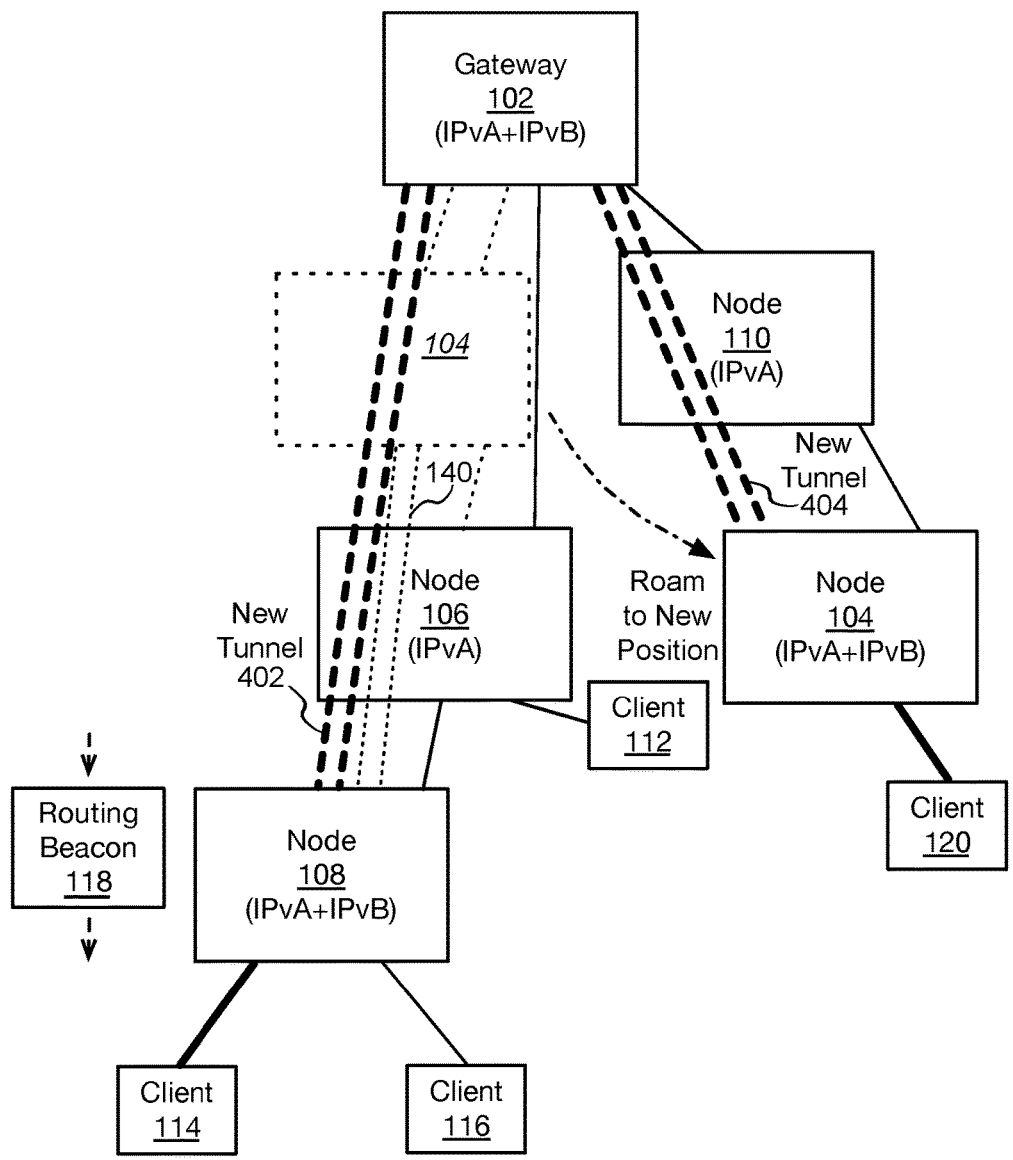
FIG. 4 shows an example wireless mesh network that includes a gateway, multiple access nodes, and multiple client devices, where an access node has roamed to a new path in the wireless mesh network, according to an embodiment.

FIG. 4 shows the example wireless mesh network of FIG. 1 that includes the gateway 102, the multiple access nodes 104, 106, 108, and 110, and multiple client devices 112, 114, and 116, and an additional example client device 140, where the access node 104 has roamed to a new path in the wireless mesh network, according to an embodiment. Also shown is the routing beacon 118 that is passed downstream from the gateway 102.

In an embodiment, the method may further include removing the IP tunnel if a new upstream routing path to an upstream gateway is selected. For example, in an embodiment, if the upstream node 104 at one end of the tunnel 140 roams to a new position in the wireless mesh network 100, the node 108 will determine that its received IPvA routing beacons no longer include node 104. For example, as shown, the node 104 has roamed to connect to the node 110. In an embodiment, this change in the IPvA upstream default route triggers a change in the IPvB upstream route as well. In this case, the node 108 removes the existing tunnel 140 and determines whether it needs to build different tunnel. Because the node 106 does not support IPvB, the node 108 determines that the gateway 102 is the closest device that supports IPvB. As such, the node 108 establishes a new tunnel 402 to the gateway 102 via the node 106. The route updates are be sent accordingly to the gateway 102. As shown, the node 104 is now connected to the node 110, which does not support IPvB. The node 104 then establishes a new tunnel 404 with the gateway 102 via the node 110.

Embodiments described herein provide various benefits. For example, the dynamic creation of tunnels as described is scalable by reducing the number of tunnels to a minimum required number of tunnels. When there are many nodes involved, only those nodes that do not support IPvB need to be skipped using the tunnels. In the case where all nodes support IPvB, no tunnels need to be created. Embodiments also support efficient multicasting, as no unnecessary duplications are needed if sent through every tunnel. Embodiments support seamless roaming since tunnels are created dynamically as needed. Embodiments also reduce the number of tunnels that are connected to the gateway, which reduces packet overhead, as fewer packets require IPvB-in-IPvA encapsulation.

Figure 5:
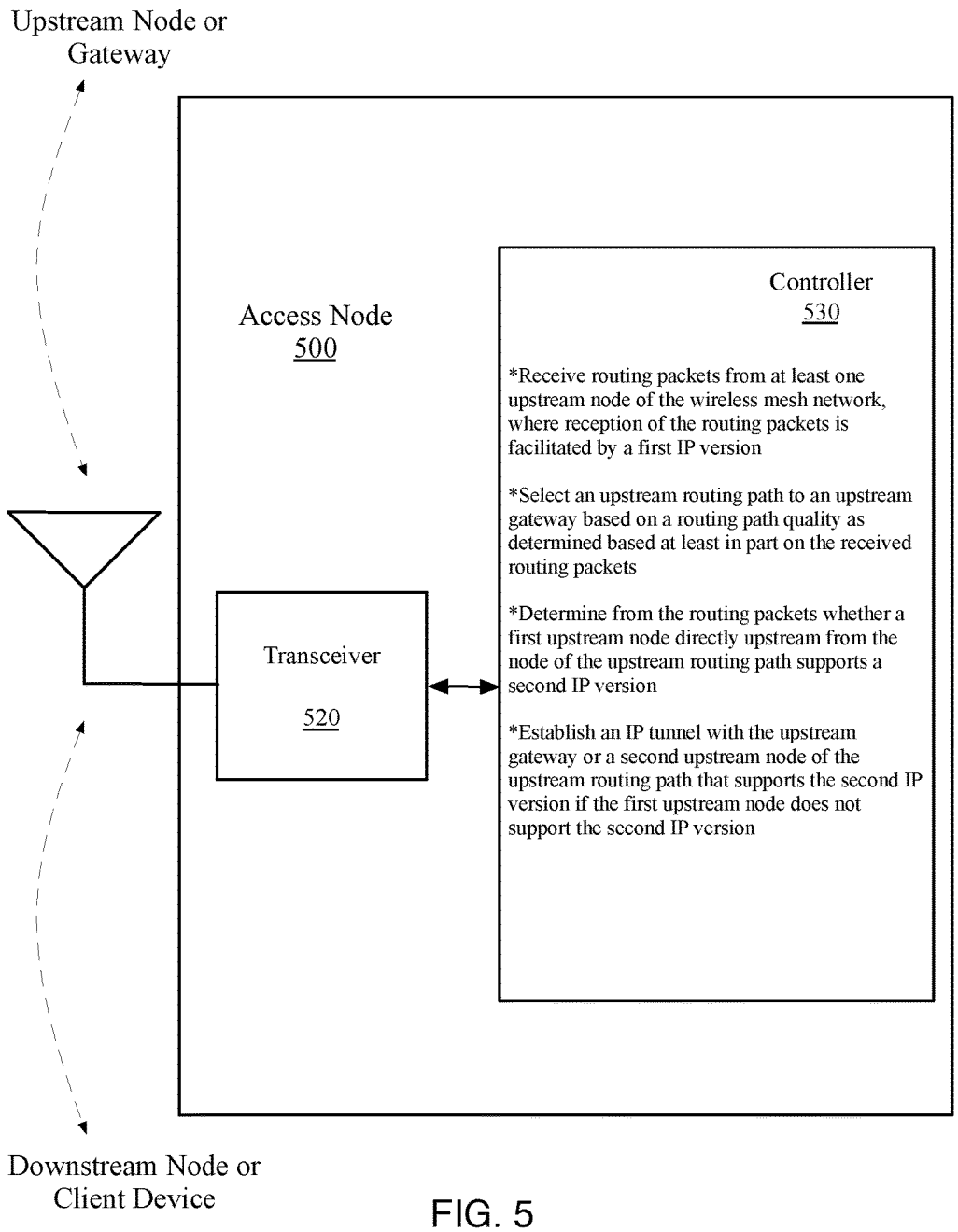
FIG. 5 shows a block diagram of an example access node and corresponding processor operations, according to an embodiment.

FIG. 5 shows a block diagram of an example access node 500 and corresponding processor operations, according to an embodiment. In various embodiments, access node 500 may be used to implementation any of the nodes 104, 106, 108, and 110 shown in FIGS. 1 and 3. As shown, the access node includes a transceiver 520 and a processor, or controller 530. In various embodiments, the transceiver 520 is operative to communicate with other devices of the wireless mesh network. For example, the transceiver 520 may be used for communicating with an upstream access node or the upstream gateway of a wireless mesh network, and/or with a client device.

For at least some embodiments, the controller 530 is operative to select a routing path to an upstream gateway. As previously described, for an embodiment, the routing paths are selected based on routing path quality, which may be based, for example, on a persistence of received routing beacons. For an embodiment, reverse beacons may be transmitted upstream, where the reverse beacons include information of the selected route, allowing upstream devices to update their routing tables in reverse routing beacons to allow the upstream devices to properly route data packets to the access node through the selected route. Accordingly, the access node maintains a routing table of downstream access nodes that have selected a routing path through the access node based on reverse routing beacons received from the downstream access nodes.

As indicated herein, for at least some embodiments, the controller 530 is operative to receive routing packets from at least one upstream node of the wireless mesh network, where reception of the routing packets is facilitated by a first IP version.

As indicated herein, for at least some embodiments, the controller 530 is further operative to select an upstream routing path to an upstream gateway based on a routing path quality as determined based at least in part on the received routing packets.

As indicated herein, for at least some embodiments, the controller 530 is further operative to determine from the routing packets whether a first upstream node directly upstream from the node of the upstream routing path supports a second IP version.

As indicated herein, for at least some embodiments, the controller 530 is further operative to establish an IP tunnel with the upstream gateway or a second upstream node of the upstream routing path that supports the second IP version if the first upstream node does not support the second IP version.

Figure 6:
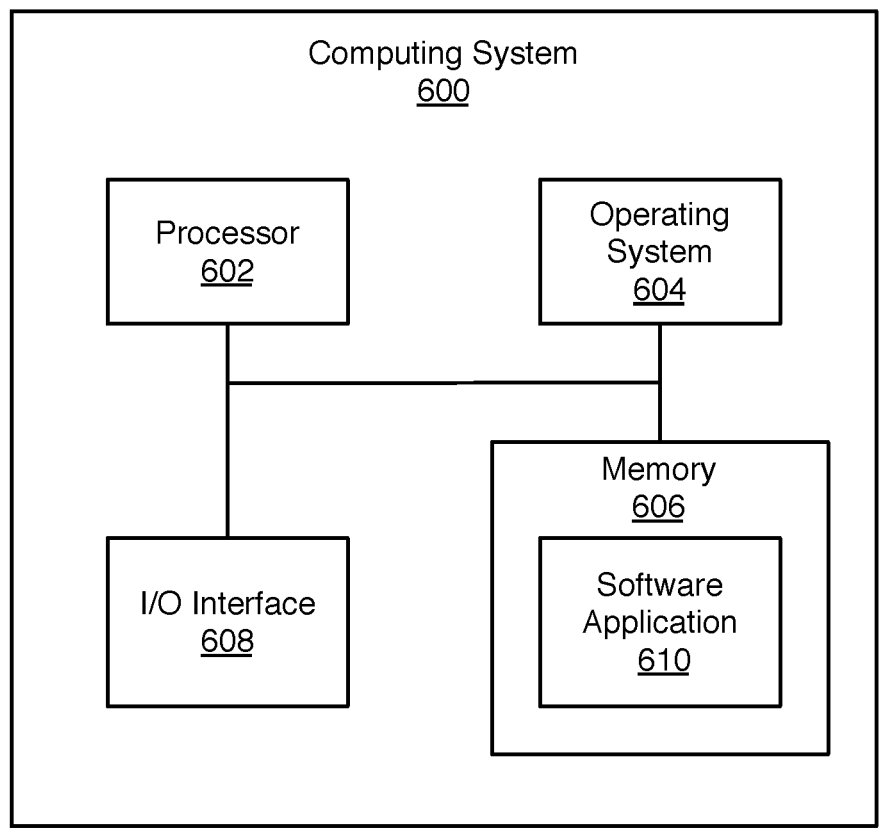
FIG. 6 shows a block diagram of an example computing system, according to an embodiment.

FIG. 6 shows a block diagram of an example computing system, according to an embodiment. Computing system 600 may be used to implement any of the nodes, gateways, and/or the client devices of FIGS. 1 and 4 and/or the node of FIG. 5, as well as to perform implementations described herein. In some implementations, computing system 600 may include a processor 602, an operating system 604, a memory 606, and an input/output (I/O) interface 608. In various implementations, processor 602 may be used to implement various functions and features described herein, as well as to perform the method implementations described herein. While processor 602 is described as performing implementations described herein, any suitable component or combination of components of computing system 600 or any suitable processor or processors associated with computing system 600 or any suitable system may perform the steps described. Implementations described herein may be carried out on a user device, on a server, or a combination of both.

Computing system 600 also includes a software application 610, which may be stored on memory 606 or on any other suitable storage location or computer-readable medium. Software application 610 provides instructions that enable processor 602 to perform the implementations described herein and other functions. Software application may also include an engine such as a network engine for performing various functions associated with one or more networks and network communications. The components of computing system 600 may be implemented by one or more processors or any combination of hardware devices, as well as any combination of hardware, software, firmware, etc.

For ease of illustration, FIG. 6 shows one block for each of processor 602, operating system 604, memory 606, I/O interface 608, and software application 610. These blocks 602, 604, 606, 608, and 610 may represent multiple processors, operating systems, memories, I/0 interfaces, and software applications. In various implementations, computing system 600 may not have all of the components shown and/or may have other elements including other types of components instead of, or in addition to, those shown herein.

Although specific embodiments have been described and illustrated, the embodiments are not to be limited to the specific forms or arrangements of parts so described and illustrated.

What is claimed:

1. A node of a wireless mesh network, the node comprising:
   one or more transceivers for communicating with other devices of the wireless mesh network; and
   a processor operative to perform operations including:
   receiving, through the one or more transceivers, a plurality of routing packets from at least one upstream node of the wireless mesh network, wherein reception of the plurality of routing packets is facilitated by a first Internet protocol (IP) version;
   selecting an upstream routing path to an upstream gateway based on a routing path quality as determined based at least in part on the received plurality of routing packets, wherein the received plurality of routing packet include an indication of whether a first upstream node directly upstream from the node of the upstream routing path supports a second IP version, wherein the second IP versions is different than the first IP version;
   determining from the plurality routing packets whether the first upstream node directly upstream from the node of the upstream routing path supports the second IP version;
   establishing an IP tunnel with the upstream gateway or a second upstream node of the upstream routing path that supports the second IP version when the first upstream node does not support the second IP version;
   roaming, by the node, comprising the node selecting a new upstream routing path based on a routing path quality as determined based at least in part on routing packets;
   determining from the routing packets whether another upstream node directly upstream from the node of the new upstream routing path supports the second IP version;
   establishing a second IP tunnel with the upstream gateway or the second upstream node of the upstream routing path that supports the second IP version when the other upstream node does not support the second IP version;
   removing the IP tunnel after establishing the second IP tunnel.

2. The node of claim 1, wherein the plurality of routing packets received from the at least one upstream node are routing beacons that originate at the upstream gateway.

3. The node of claim 1, wherein each routing packet of the plurality of routing packets received from the at least one upstream node includes routing table information and a list of upstream nodes that support the second IP version.

4. The node of claim 1, wherein each routing packet of the plurality of routing packets includes routing table information that includes all nodes in the routing path to the gateway.

5. The node of claim 1, wherein the operations further comprise selecting the first upstream node based at least in part on the first upstream node having a highest quality routing path.

6. The node of claim 1, wherein the node stores a first routing table that associated with the first IP version, and wherein the node stores a second routing table that is associated with the second IP version.

7. The node of claim 1, wherein the operations further comprise:
   generating a tunnel identifier for the IP tunnel, wherein the tunnel identifier includes a node identifier associated with the second upstream node; and
   communicating a reverse beacon to the second upstream node, wherein the reverse beacon indicates the establishing of the IP tunnel.

8. The node of claim 1,
   further comprising the operations of:
   adding to each routing packet received from the at least one upstream node, information that indicates one or more IP versions that the node supports; and
   transmitting each routing packet with the added information downstream.

9. The node of claim 1, wherein the operations further comprise:
   receiving a plurality of data packets from at least one downstream node, wherein each data packet of the plurality of data packets is compliant with the second IP version;
   encapsulating each data packet of the plurality of data packets that are compliant with the second IP version with a header that is compliant with the first IP version; and
   transmitting the encapsulated data packets upstream to an upstream node that supports the second IP version.

10. The node of claim 1, wherein the operations further comprise removing the IP tunnel if a new upstream routing path to an upstream gateway is selected.

11. A method of establishing a wireless mesh network, the method comprising:
    receiving, through the one or more transceivers, a plurality of routing packets from at least one upstream node of the wireless mesh network, wherein reception of the plurality of routing packets is facilitated by a first Internet protocol (IP) version;
    selecting an upstream routing path to an upstream gateway based on a routing path quality as determined based at least in part on the received plurality of routing packets, wherein the received plurality of routing packet include an indication of whether a first upstream node directly upstream from the node of the upstream routing path supports a second IP version, wherein the second IP versions is different than the first IP version;
    determining from the plurality routing packets whether the first upstream node directly upstream from the node of the upstream routing path supports the second IP version;
    establishing an IP tunnel with the upstream gateway or a second upstream node of the upstream routing path that supports the second IP version when the first upstream node does not support the second IP version;

roaming, by the node, comprising the node selecting a new upstream routing path based on a routing path quality as determined based at least in part on routing packets;

determining from the routing packets whether another upstream node directly upstream from the node of the new upstream routing path supports the second IP version;

establishing a second IP tunnel with the upstream gateway or the second upstream node of the upstream routing path that supports the second IP version when the other upstream node does not support the second IP version;

removing the IP tunnel after establishing the second IP tunnel.

12. The method of claim 11, wherein the plurality of routing packets received from the at least one upstream node are routing beacons that originate at the upstream gateway.

13. The method of claim 11, wherein each routing packet of the plurality of routing packets received from the at least one upstream node includes routing table information and a list of upstream nodes that support the second IP version.

14. The method of claim 11, wherein each routing packet of the plurality of routing packets includes routing table information that includes all nodes in the routing path to the gateway.

15. The method of claim 11, further comprising selecting the first upstream node based at least in part on the first upstream node having a highest quality routing path.

16. The method of claim 11, wherein the node stores a first routing table that associated with the first IP version, and wherein the node stores a second routing table that is associated with the second IP version.

17. The method of claim 11, further comprising:
generating a tunnel identifier for the IP tunnel, wherein the tunnel identifier includes a node identifier associated with the second upstream node; and
communicating a reverse beacon to the second upstream node, wherein the reverse beacon indicates the establishing of the IP tunnel.

18. The method of claim 11, further comprising:
adding to each routing packet received from the at least one upstream node, information that indicates one or more IP versions that the node supports; and
transmitting each routing packet with the added information downstream.

19. The method of claim 11, further comprising:
receiving a plurality of data packets from at least one downstream node, wherein each data packet of the plurality of data packets is compliant with the second IP version;
encapsulating each data packet of the plurality of data packets that are compliant with the second IP version with a header that is compliant with the first IP version; and
transmitting the encapsulated data packets upstream to an upstream node that supports the second IP version.

* * * * *